(12) United States Patent
Kanbe et al.

(10) Patent No.: US 9,829,865 B2
(45) Date of Patent: Nov. 28, 2017

(54) ADAPTIVE MAINTENANCE SUPPORT AND CONTROL OF A PROCESS CONTROL SYSTEM VIA DEVICE SPECIFICATION AND ACTUAL CONDITION INFORMATION

(71) Applicant: YOKOGAWA ELECTRIC CORPORATION, Musashino-shi, Tokyo (JP)

(72) Inventors: Takahiro Kanbe, Tokyo (JP); Mitsuhiro Yamamoto, Tokyo (JP); Nobuaki Ema, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 765 days.

(21) Appl. No.: 14/013,847

(22) Filed: Aug. 29, 2013

(65) Prior Publication Data
US 2014/0067089 A1 Mar. 6, 2014

(30) Foreign Application Priority Data
Aug. 31, 2012 (JP) .................................. 2012-191351

(51) Int. Cl.
G05B 6/02 (2006.01)
G05B 19/418 (2006.01)

(52) U.S. Cl.
CPC ......... *G05B 6/02* (2013.01); *G05B 19/41845* (2013.01); *G05B 2219/25057* (2013.01);
(Continued)

(58) Field of Classification Search
CPC ..... G05B 6/02; G05B 19/41845; Y02P 90/14; Y02P 90/16
(Continued)

(56) References Cited

U.S. PATENT DOCUMENTS 4,351,029 A * 9/1982 Maxey ..................... G01N 3/58
340/680
4,442,494 A * 4/1984 Fromson ............ G05B 19/4065
340/680
(Continued)

FOREIGN PATENT DOCUMENTS

JP 2859407 B2 2/1999
JP 3445470 B2 9/2003
(Continued)

OTHER PUBLICATIONS

Cua, K.O.; McKone, K.E. and Schroeder, R.G., "Relationships Between Implementation of TQM, JIT and TPM and Manufacturing Performance", 2001, Journal of Operations Management, 19, 675-694.*

(Continued)

*Primary Examiner* — Mohammad Ali
*Assistant Examiner* — Kelvin Booker
(74) *Attorney, Agent, or Firm* — Westerman, Hattori, Daniels & Adrian, LLP

(57) ABSTRACT

A maintenance support system include includes: a first storage unit which stores first specification information indicating a specification of a process control system which performs control of an industrial process implemented in a plant; an actual condition information extraction unit configured to extract actual condition information indicating an actual condition for the process control system; and a first comparison unit configured to output first information indicating a result of comparing the first specification information stored in the first storage unit with the actual condition information extracted by the extraction unit.

23 Claims, 10 Drawing Sheets

(52) U.S. Cl.
CPC .......... G05B 2219/25068 (2013.01); G05B 2219/25074 (2013.01); G05B 2219/32142 (2013.01); Y02P 90/14 (2015.11); Y02P 90/16 (2015.11); Y02P 90/18 (2015.11)

(58) Field of Classification Search
USPC .......... 700/73, 95, 108, 174, 175, 176, 177
See application file for complete search history.

(56) References Cited

U.S. PATENT DOCUMENTS

| | | | | |
|---|---|---|---|---|
| 4,471,444 A * | 9/1984 | Yee | B23Q 17/0947 | 700/175 |
| 5,134,574 A * | 7/1992 | Beaverstock | G05B 13/00 | 700/2 |
| 5,231,594 A * | 7/1993 | Knibiehler | G07C 3/04 | 377/15 |
| 5,319,357 A * | 6/1994 | Diei | G05B 19/4065 | 340/680 |
| 5,367,473 A * | 11/1994 | Chu | G06F 11/34 | 702/186 |
| 5,407,265 A * | 4/1995 | Hamidieh | G05B 19/4065 | 340/680 |
| 5,587,931 A * | 12/1996 | Jones | G05B 23/0235 | 340/680 |
| 5,602,347 A * | 2/1997 | Matsubara | G05B 19/4065 | 700/175 |
| 6,421,571 B1 * | 7/2002 | Spriggs | G05B 15/02 | 345/629 |
| 6,449,624 B1 | 9/2002 | Hammack et al. | | |
| 6,646,564 B1 * | 11/2003 | Azieres | G08B 25/14 | 340/506 |
| 6,957,186 B1 * | 10/2005 | Guheen | G06Q 90/20 | 705/323 |
| 7,089,530 B1 * | 8/2006 | Dardinski | G05B 15/02 | 700/83 |
| 7,130,701 B1 * | 10/2006 | Wischinski | G05B 19/042 | 700/108 |
| 7,356,393 B1 * | 4/2008 | Schlatre | G06Q 10/06 | 340/438 |
| 7,664,780 B1 * | 2/2010 | Beachy | G06Q 10/06 | 700/96 |
| 8,498,729 B2 * | 7/2013 | Popp | G06Q 10/00 | 426/407 |
| 8,660,875 B2 * | 2/2014 | Yedatore | G05B 23/0283 | 705/7.11 |
| 8,676,762 B2 * | 3/2014 | Pafumi | G06F 11/1415 | 707/640 |
| 8,706,284 B2 * | 4/2014 | Watanabe | G05B 19/4062 | 700/108 |
| 8,977,591 B1 * | 3/2015 | Syed | G06F 17/30575 | 707/612 |
| 8,989,887 B2 * | 3/2015 | Stafford | G06Q 10/06 | 700/108 |
| 9,600,513 B2 * | 3/2017 | Bourbonnais | G06F 17/30371 | |
| 2002/0152576 A1 * | 10/2002 | Murray | B60S 1/3481 | 15/250.352 |
| 2003/0167238 A1 * | 9/2003 | Zeif | G05B 23/0267 | 705/400 |
| 2004/0088065 A1 * | 5/2004 | Robitaille | G05B 19/41865 | 700/95 |
| 2004/0162887 A1 * | 8/2004 | Dillon | G05B 19/4185 | 709/217 |
| 2004/0181294 A1 | 9/2004 | Deitz et al. | | |
| 2004/0186603 A1 * | 9/2004 | Sanford | G05B 23/0245 | 700/95 |
| 2005/0143956 A1 * | 6/2005 | Long | G05B 19/4065 | 702/184 |
| 2005/0188267 A1 * | 8/2005 | Farchmin | G05B 19/4184 | 714/35 |
| 2005/0251278 A1 * | 11/2005 | Popp | G05B 23/0224 | 700/110 |
| 2006/0109376 A1 * | 5/2006 | Chaffee | G05B 19/0423 | 348/423.1 |
| 2007/0143585 A1 * | 6/2007 | Ring | G05B 19/0428 | 713/1 |
| 2007/0198700 A1 * | 8/2007 | Vivian | G06F 11/2097 | 709/224 |
| 2007/0250180 A1 * | 10/2007 | Bump | G05B 19/41845 | 700/1 |
| 2008/0010042 A1 * | 1/2008 | Kanbe | G06F 17/50 | 703/1 |
| 2008/0126845 A1 * | 5/2008 | Luo | G06F 11/1482 | 714/6.3 |
| 2008/0221722 A1 * | 9/2008 | Popp | G01N 33/15 | 700/110 |
| 2008/0294361 A1 * | 11/2008 | Popp | G06Q 50/04 | 702/81 |
| 2009/0083649 A1 * | 3/2009 | Baier | G05B 17/02 | 715/771 |
| 2009/0089231 A1 * | 4/2009 | Baier | G05B 19/41875 | 706/45 |
| 2009/0089233 A1 * | 4/2009 | Gach | G05B 19/4185 | 706/45 |
| 2009/0271021 A1 * | 10/2009 | Popp | G05B 23/0291 | 700/110 |
| 2010/0257513 A1 * | 10/2010 | Thirumalai | G06F 11/3428 | 717/134 |
| 2011/0313547 A1 * | 12/2011 | Hernandez | G05B 19/042 | 700/23 |
| 2012/0016607 A1 * | 1/2012 | Cottrell | G05B 23/0229 | 702/62 |
| 2012/0310397 A1 * | 12/2012 | Rataul | G05B 19/41805 | 700/95 |
| 2013/0253897 A1 * | 9/2013 | Kanbe | G05B 11/01 | 703/13 |
| 2013/0325997 A1 * | 12/2013 | Higgins | H04L 41/0893 | 709/208 |
| 2014/0012398 A1 * | 1/2014 | Kanbe | G05B 15/02 | 700/2 |
| 2014/0163713 A1 * | 6/2014 | Ross | G06Q 10/04 | 700/108 |
| 2014/0337429 A1 * | 11/2014 | Asenjo | H04L 65/403 | 709/204 |

FOREIGN PATENT DOCUMENTS

| | | |
|---|---|---|
| JP | 2004-295814 A | 10/2004 |
| JP | 4074344 B2 | 4/2008 |
| JP | 4399773 B2 | 1/2010 |
| WO | 98/14849 A1 | 4/1998 |

OTHER PUBLICATIONS

Heng, A.; Zhang, S.; Tan, A.C.C. and Mathew, J., "Rotating Machinery Prognostics: State of the Art, Challenges and Opportunities", 2009, Mechanical Systems and Signal Processing, 23, 724-739.*

Luxhej, J.T.; Riis, J.O. and Thorsteinsson, U., "Trends and Perspectives: Trends and Perspectives in Industrial Maintenance Management", 1997, Journal of Manufacturing Systems, vol. 16, No. 6.*

Peng, Y.; Dong, M. and Zuo, M.J., "Current Status of Machine Prognostics in Condition-Based Maintenance: A Review", Mar. 9, 2009, Int. Journal Advance Manufacturing, 50: 297-313.*

* cited by examiner

FIG. 6A

| ACTUAL CONDITION INFORMATION | SPECIFICATION INFORMATION |
|---|---|
| SW1. P1-SENSOR DEVICE 61a | SW1. P1-SENSOR DEVICE 61a |
| SW1. P4—SW2. P1 | SW1. P4—SW2. P1 |
| SW2. P2—SW3. P1 | SW2. P2—SW3. P1 |
| SW2. P4-CONTROLLER 62 | SW2. P4-CONTROLLER 62 |
| SW3. P4-VALVE DEVICE 61b | SW3. P4-VALVE DEVICE 61b |

FIG. 6B

| ACTUAL CONDITION INFORMATION | SPECIFICATION INFORMATION | |
|---|---|---|
| SW3. P2-SENSOR DEVICE 61a | SW3. P1-SENSOR DEVICE 61a | ⎫ |
| — | SW1. P4—SW2. P1 | ⎬ D1 |
| SW2. P2—SW3. P1 | SW2. P2—SW3. P1 | ⎭ |
| SW2. P4-CONTROLLER 62 | SW2. P4-CONTROLLER 62 | |
| SW3. P4-VALVE DEVICE 61b | SW3. P4-VALVE DEVICE 61b | |

FIG. 6C

| ACTUAL CONDITION INFORMATION | SPECIFICATION INFORMATION |
|---|---|
| P2-SENSOR DEVICE 61a | P2-SENSOR DEVICE 61a |
| — | — |
| SW2. P2—SW3. P1 | SW2. P2—SW3. P1 |
| SW2. P4-CONTROLLER 62 | SW2. P4-CONTROLLER 62 |
| SW3. P4-VALVE DEVICE 61b | SW3. P4-VALVE DEVICE 61b |

FIG. 10A

| ACTUAL CONDITION INFORMATION | SPECIFICATION INFORMATION | MASTER INFORMATION |
|---|---|---|
| SW3. P2-SENSOR DEVICE 61a | SW1. P1-SENSOR DEVICE 61a | SW1. P1-SENSOR DEVICE 61a |
| ————— | SW1. P4—SW2. P1 | SW1. P4—SW2. P1 |
| SW2. P2—SW3. P1 | SW2. P2—SW3. P1 | SW2. P2—SW3. P1 |
| SW2. P4-CONTROLLER 62 | SW2. P4-CONTROLLER 62 | SW2. P4-CONTROLLER 62 |
| SW3. P4-VALVE DEVICE 61b | SW3. P4-VALVE DEVICE 61b | SW3. P4-VALVE DEVICE 61b |

| ACTUAL CONDITION INFORMATION | SPECIFICATION INFORMATION | MASTER INFORMATION |
|---|---|---|
| SW3. P2-SENSOR DEVICE 61a | SW3. P2-SENSOR DEVICE 61a | SW1. P1-SENSOR DEVICE 61a |
| ————— | ————— | SW1. P4—SW2. P1 |
| SW2. P2—SW3. P1 | SW2. P2—SW3. P1 | SW2. P2—SW3. P1 |
| SW2. P4-CONTROLLER 62 | SW2. P4-CONTROLLER 62 | SW2. P4-CONTROLLER 62 |
| SW3. P4-VALVE DEVICE 61b | SW3. P4-VALVE DEVICE 61b | SW3. P4-VALVE DEVICE 61b |

FIG. 10C

| ACTUAL CONDITION INFORMATION | SPECIFICATION INFORMATION | MASTER INFORMATION |
|---|---|---|
| SW3. P2-SENSOR DEVICE 61a | SW3. P2-SENSOR DEVICE 61a | SW3. P2-SENSOR DEVICE 61a |
| ————— | ————— | ————— |
| SW2. P2—SW3. P1 | SW2. P2—SW3. P1 | SW2. P2—SW3. P1 |
| SW2. P4-CONTROLLER 62 | SW2. P4-CONTROLLER 62 | SW2. P4-CONTROLLER 62 |
| SW3. P4-VALVE DEVICE 61b | SW3. P4-VALVE DEVICE 61b | SW3. P4-VALVE DEVICE 61b |

ADAPTIVE MAINTENANCE SUPPORT AND CONTROL OF A PROCESS CONTROL SYSTEM VIA DEVICE SPECIFICATION AND ACTUAL CONDITION INFORMATION

BACKGROUND OF THE INVENTION

Field of the Invention

The present invention relates to a maintenance support system, a maintenance support apparatus and a maintenance support method which support maintenance of a process control system built in a plant, a factory or the like.

Priority is claimed on Japanese Patent Application No. 2012-191351, filed on Aug. 31, 2012, the contents of which are incorporated herein by reference.

Background Art

Conventionally, a process control system for controlling various state amounts (e.g., pressure, temperature, and flow amount) in an industrial process is built in a plant, a factory or the like (hereinafter collectively referred to simply as a "plant"), and advanced automatic operation is implemented. In this process control system, a site device (a measuring device or a manipulation device) generally called a field device, and a controller which controls the site device are connected through a communication means. The controller collects process values (e.g., measurement values of the pressure, the temperature, the flow amount and the like) obtained in the field device, and manipulates (controls) the field device according to the collected process values. Accordingly, the process control system performs control of various state amounts.

In most conventional process control systems, a field device having an analog communication function and a controller are connected in a one-to-one correspondence relationship via an analog transmission line (e.g., a transmission line used for transmission of a "4 to 20 mA" signal). On the other hand, in a recent process control system, a digitized field device and a controller are often connected via a wired or wireless network (e.g., a field network) in order to realize an enhanced function.

Design, construction, and maintenance of such a process control system are generally performed by many engineers. For example, design of an operating scheme of the process control system is performed by a plant engineer. Creation of a specification of the process control system implementing the designed operating scheme is performed by a system engineer. Further, the construction and the maintenance of the process control system are performed by cooperation of site engineers and system engineers in charge of respective components (e.g., the field device, the controller, the network, and various programs used in the process control system) of the process control system.

In Japanese U.S. Pat. No. 3,445,470, Japanese U.S. Pat. No. 4,074,344, and Japanese U.S. Pat. No. 2,859,407, technologies for supporting maintenance and management of a plant or a process control system are disclosed. Specifically, in U.S. Pat. No. 3,445,470, technology for storing information on a remodeling construction of a plant facility in a computer device and managing an implementation status of the remodeling construction related to the plant facilities is disclosed. In U.S. Pat. No. 4,074,344, technology for automatically creating management drawings representing an interconnection between elements of a plant from a point connection and a control language script of a process control system is disclosed. In U.S. Pat. No. 2,859,407, technology for organically connecting a plurality of systems built in a plant and supporting reasonable maintenance and management under unified information management is disclosed.

From the viewpoint of effective utilization of facilities, a plant is required to be able to flexibly cope with a change in products and a production amount and safely work for a long period of time (e.g., 30 years or more). Similarly, a process control system built in the plant is required to be able to flexibly cope with a change in products and a production amount and operate for a long period of time equal to or longer than a working period of the plant.

In a process control system whose flexible operation is performed for a long period of time, a change in components constituting the process control system frequently occurs due to deterioration of facilities provided in a plant, a change in processes and materials, enhancement of efficiency or the like. The maintenance of the process control system is performed through cooperation between the site engineer and the system engineer, as described above. Therefore, when components constituting the process control system are changed, a task of changing contents of the specification is first performed by the system engineer. Then, a task (e.g., exchange or adjustment of field devices or the like) according to the changed contents of the specification is performed by the site engineer.

Thus, in the process control system, the components are changed based on the contents of the specification. Therefore, the process control system is basically configured according to the contents of the specification. However, an actual condition (actual configuration or actual settings) of the process control system may not necessarily conform to the contents of the specification but may deviate from the contents of the specification. This is because there is a case in which communication is not sufficiently performed between the system engineer performing a task of changing the contents of the specification and the site engineer performing the task according to the contents of the specification (or a case in which it is unnecessary to sufficiently perform the communication).

For example, in a recent process control system in which a field device and a controller are connected over a network, an operation can be performed if the field device is connected to the network. Therefore, a position of the connection of the field device to the network may not be so important. In this case, even when a site engineer connects the field device to a position different from that in the specification, the process control system works without problems. Therefore, the fact that a task different from the contents of the specification has been performed is not sent from the site engineer to a system engineer and accordingly a difference between the contents of the specification and the actual condition for the process control system is generated.

Here, even when the actual condition for the process control system deviates slightly from the contents of the specification, the process control system works normally, and problems are considered to rarely occur if components are not changed. However, when flexible operation is performed for a long period of time and a change in components is frequently performed, a difference between the actual condition for the process control system and the contents of the specification is considered to gradually increase.

Further, in a process control system whose operation is performed for a long period of time, an engineer involved in maintenance may be changed. Therefore, an actual condition for the process control system is also likely not to be recognized from the contents of the specification. When the actual condition for the process control system cannot be recognized from the contents of the specification, it is necessary to perform a confirmation task for confirming the actual condition, and a maintenance task takes much time. Further, when remodeling or updating of the process control system is performed, there may be a difference between a situation and the contents of the specification and accordingly it is necessary to perform the above confirmation task prior to the remodeling or updating.

SUMMARY OF THE INVENTION

Some aspects of the present invention provide a maintenance support system, a maintenance support apparatus and a maintenance support method capable of supporting maintenance of a process control system by presenting a difference between an actual condition and a specification of the process control system.

(1) A first aspect of the present invention is a maintenance support system, including: a first storage unit which stores first specification information indicating a specification of a process control system which performs control of an industrial process implemented in a plant; an actual condition information extraction unit configured to collect information regarding the process control system, and extract, from the collected information, actual condition information indicating an actual condition for the process control system; and a first comparison unit configured to output first information indicating a result of comparing the first specification information stored in the first storage unit with the actual condition information extracted by the extraction unit.

By the first aspect of the present invention, the actual condition information indicating the actual condition of the process control system is extracted by the actual condition information extraction unit, the extracted actual condition information and the first specification information of the first storage unit are compared by the first comparison unit, and the first information indicating the result of comparing is output.

(2) In the first aspect of the present invention, the maintenance support system may further include: a second storage unit which stores second specification information indicating a specification of the process control system; a second comparison unit configured to output second information indicating a result of comparing the second specification information stored in the second storage unit with the actual condition information extracted by the extraction unit; and an updating unit configured to update the second storage unit so that the contents of correction for the first specification information stored in the first storage unit are reflected in the second storage unit when the first information output from the first comparison unit indicates that there is no difference between the first specification information and the actual condition information.

(3) In the first aspect of the present invention, the updating unit may be configured to add, to the second information, at least one of information on a time point at which a change was occurred in the first information and information on a time point at which a change was occurred in the second information when updating the second storage unit.

(4) In the first aspect of the present invention, the actual condition information extraction unit may be configured to extract, as the actual condition information, at least one of: information indicating a type and setting content of a field device installed in the plant, and information indicating an installation position of the field device.

(5) In the first aspect of the present invention, the actual condition information extraction unit may be configured to extract the actual condition information of a previously defined format.

(6) In the first aspect of the present invention, the maintenance support system may further include: a specification information extraction unit configured to extract, as the first specification information, information of the same type as the actual condition information extracted by the actual condition information extraction unit, wherein the first comparison unit may be configured to output the first information indicating the result of comparing the first specification information extracted by the specification information extraction unit with the actual condition information extracted by the actual condition information extraction unit.

(7) In the first aspect of the present invention, the first storage unit may store the first specification information in a unified format.

(8) In the first aspect of the present invention, the first comparison unit may be configured to include, in the first information, information indicating a time at which a difference was generated between the first specification information and the actual condition information, and information on a place in which the difference was generated when there is the difference between the first specification information and the actual condition information.

(9) In the first aspect of the present invention, the first comparison unit may be configured to include, in the first information, information indicating a time at which a difference was resolved between the first specification information and the actual condition information and information indicating a place in which the difference was resolved.

(10) In the first aspect of the present invention, the maintenance support system may further include a notification unit configured to notify a terminal device of an engineer managing the process control system of the first information output by the first comparison unit.

(11) In the first aspect of the present invention, the specification information extraction unit may be configured to extract the first specification information in a certain period or when the first specification information stored in the first storage unit is changed.

(12) In the first aspect of the present invention, the first storage unit may store maintenance information of the process control system in correlation with the first specification information when the first specification information is updated.

(13) In the first aspect of the present invention, the first storage unit may store the first specification information before updating without deleting the first specification information before updating when the first specification information is updated.

(14) In the first aspect of the present invention, the maintenance support system may further include: a specification information extraction unit configured to extract, as the first specification information, information of the same type as the actual condition information extracted by the actual condition information extraction unit, wherein the second storage unit may store, as the second specification information, the same specification information as a format extracted by the specification information extraction unit.

(15) In the first aspect of the present invention, the maintenance support system may further include a notification unit configured to notify a terminal device of an engineer managing the process control system of the second information output by the second comparison unit.

(16) In the first aspect of the present invention, the maintenance support system may further include an actual condition input unit configured to input the actual condition information.

(17) A second aspect of the present invention is a maintenance support apparatus, including: a first comparison unit configured to output first information indicating a result of comparing first specification information indicating a specification of a process control system performing control of an industrial process implemented in a plant with actual condition information indicating an actual condition for the process control system.

(18) A third aspect of the present invention is a maintenance support method, including: storing, in a first storage unit, first specification information indicating a specification of a process control system performing control of an industrial process implemented in a plant; collecting information regarding the process control system, and extracting, from the collected information, actual condition information indicating an actual condition for the process control system; and outputting first information indicating a result of comparing the first specification information stored in the first storage unit with the extracted actual condition information.

(19) In the third aspect of the present invention, the maintenance support method may include: storing, in a second storage unit, second specification information indicating a specification of the process control system; outputting second information indicating a result of comparing the second specification information stored in the second storage unit with the extracted actual condition information; and performing updating so that the contents of correction for the first specification information stored in the first storage unit are reflected in the second specification information when the output first information indicates that there is no difference between the first specification information and the actual condition information.

(20) In the third aspect of the present invention, the maintenance support method may include: adding, to the second information, at least one of information on a time point at which a change was occurred in the first information and information on a time point at which a change was occurred in the second information when the second specification information is updated.

According to first to third aspects of the present invention, actual condition information indicating an actual condition for a process control system is extracted, the extracted actual condition information and first specification information are compared, first information indicating a result of the comparison is output, and a difference between the actual condition and the specification of the process control system is automatically presented. Therefore, it is possible to easily match the first specification information with the actual condition information of the process control system. Accordingly, it is possible to efficiently perform maintenance of the process control system in a short period of time even when the process control system is operated for a long period of time and a change in components is frequently performed.

BRIEF DESCRIPTION OF THE DRAWINGS

FIG. 6A is a diagram illustrating actual condition information and specification information of a field network N1 in an initial state in the first embodiment of the present invention.

FIG. 6B is a diagram illustrating actual condition information and specification information when a difference illustrated in FIGS. 3A and 3B has been generated.

FIG. 6C is a diagram illustrating actual condition information and specification information after a difference illustrated in FIGS. 3A and 3B has been eliminated.

FIG. 10A is a diagram illustrating actual condition information, specification information and master information when the difference illustrated in FIGS. 3A and 3B has been generated in the second embodiment of the present invention.

FIG. 10B is a diagram illustrating actual condition information, specification information and master information after the difference illustrated in FIGS. 3A and 3B has been eliminated.

FIG. 10C is a diagram illustrating actual condition information, specification information and master information after master information has been updated.

PREFERRED EMBODIMENTS

Hereinafter, a maintenance support system, a maintenance support apparatus and a maintenance support method according to embodiments of the present invention will be described with reference to drawings in detail. It will be apparent to those skilled in the art based on this disclosure that the following description of first and second embodiments of the present invention merely explains inventions defined in the attached claims and their equivalents concretely and is not intended to limit the inventions and their equivalents.

First Embodiment

Figure 1:
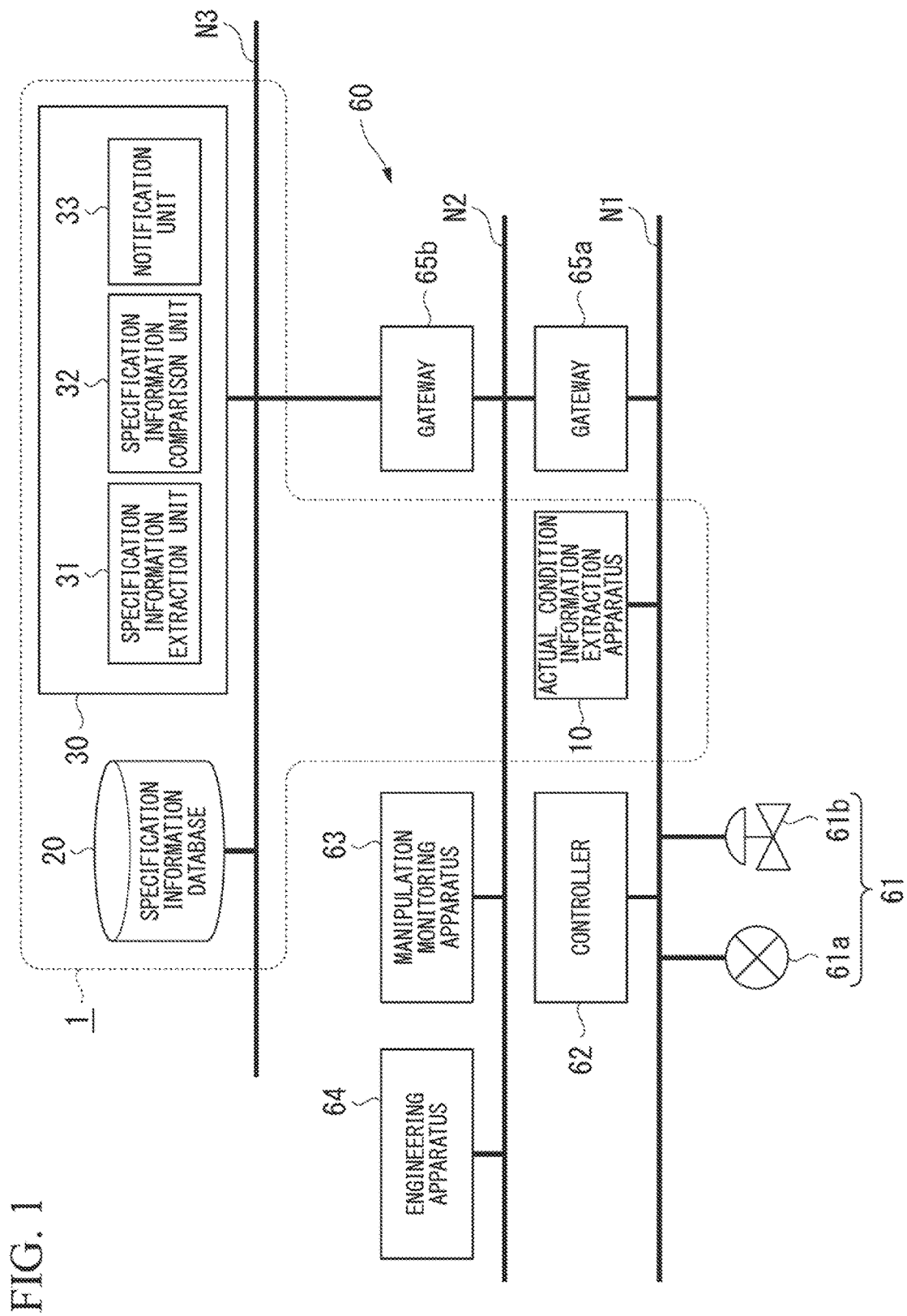
FIG. 1 is a block diagram illustrating a main configuration of a maintenance support system according to a first embodiment of the present invention.

FIG. 1 is a block diagram illustrating a main configuration of a maintenance support system 1 according to a first embodiment of the present invention. The maintenance support system 1 of the first embodiment is provided to be accompanied with a process control system 60, and supports maintenance of the process control system 60. Further, hereinafter, the process control system 60 which is a support target of the maintenance support system 1 will first be described, and then details of the maintenance support system 1 will be described.

<Process Control System>

The process control system 60 includes a field device 61 (61a and 61b), a controller 62, a manipulation monitoring apparatus 63, an engineering apparatus 64, and gateways 65a and 65b, as illustrated in FIG. 1. The process control system 60 having such a configuration performs control of an industrial process implemented in a plant (not illustrated) by the controller 62 controlling a plurality of field devices 61 under monitoring of the manipulation monitoring apparatus 63.

Here, in the plant in which the maintenance support system 1 and the process control system 60 are built, a field network N1, a control network N2, and an information network N3 are provided. The field network N1 is, for example, a network constructed on site at the plant. The control network N2 is, for example, a network which connects between the plant site and a monitoring room of the plant. The information network N3 is, for example, a network constructed in the monitoring room of the plant.

Further, in FIG. 1, although the field network N1, the control network N2 and the information network N3 are briefly illustrated, these networks actually include network switches or the like. The field network N1, the control network N2 and the information network N3 may be wired networks, may be wireless networks, or may be networks in which wired and wireless networks are both included.

The field device 61 is, for example, a sensor device such as a flowmeter or a temperature sensor, a valve device such as a flow amount control valve or an opening and closing valve, an actuator device such as a fan or a motor, or another device installed on site at the plant. The field device 61 is connected to the field network N1. Further, in the first embodiment, a case in which a state amount in an industrial process to be controlled is a flow amount of fluid will be described by way of example to facilitate understanding. Therefore, one sensor device 61a which measures the flow amount of the fluid and one valve device 61b which controls (manipulates) the flow amount of the fluid in the field device 61 installed in the plant are illustrated in FIG. 1.

The controller 62 is connected to the field network N1 and the control network N2, and performs control of the state amount (the flow amount of the fluid) in the industrial process under the monitoring of the manipulation monitoring apparatus 63. Specifically, the controller 62 collects measurement data from the sensor device 61a under the monitoring of the manipulation monitoring apparatus 63 and obtains a control amount of the valve device 61b from the collected measurement data to control the valve device 61b.

The manipulation monitoring apparatus 63 is connected to the control network N2 and performs monitoring and management of the field device 61 and the controller 62 connected to the field network N1. Specifically, the manipulation monitoring apparatus 63 performs transmission or reception of various parameters to or from the controller 62 via the control network N2 to perform monitoring of the field device 61. For example, the manipulation monitoring apparatus 63 acquires a parameter set in the field device 61 from the controller 62 to recognize a present measurement condition, and causes the controller 62 to set a new parameter in the field device 61 to perform a change of the measurement condition or the like.

The manipulation monitoring apparatus 63 includes an input device such as a keyboard or a pointing device, and a display unit such as a liquid crystal display device. The manipulation monitoring apparatus 63 displays a monitoring result of the field device 61 and the controller 62 on the display unit to provide information indicating a state of the plant to an operator (an operator of the plant) or the like, and controls the controller 62 according to an instruction input by the operator manipulating the input device.

The engineering apparatus 64 is connected to the control network N2 and used to perform maintenance of the process control system 60. This engineering apparatus 64, for example, is manipulated by an engineer who performs the maintenance of the process control system 60, and performs, for example, settings of parameters of components (e.g., the controller 62) of the process control system 60 according to an instruction of the engineer.

The gateway 65a is provided between the field network N1 and the control network N2 to connect the field network N1 and the control network N2. The gateway 65b is provided between the control network N2 and the information network N3 to connect the control network N2 and the information network N3. As the gateways 65a and 65b are provided, the field network N1, the control network N2 and the information network N3 can be connected to one another while maintaining security.

<Maintenance Support System>

The maintenance support system 1 includes an actual condition information extraction apparatus 10 (actual condition information extraction unit), a specification information database 20 (a first storage unit), and an application server 30 (the maintenance support apparatus), as illustrated in FIG. 1. The maintenance support system 1 supports the maintenance of the process control system 60 by presenting a difference between a specification of the process control system 60 and an actual condition (e.g., an actual configuration or actual settings) of the process control system 60.

The actual condition information extraction apparatus 10 is an apparatus which extracts actual condition information indicating an actual condition for the process control system 60 and is connected to the field network N1. The actual condition information extraction apparatus 10 communicates with the field device 61, the controller 62, the manipulation monitoring apparatus 63 and the engineering apparatus 64 via the field network N1 and the control network N2 to collect various pieces of information. The actual condition information extraction apparatus 10 extracts the actual condition information indicating the actual condition for the process control system 60 from the various collected information. Further, the actual condition information extraction apparatus 10 may be realized, for example, by a computer including an input device such as a keyboard or a pointing device, a display unit such as a liquid crystal display device, a CPU (central processing unit), a memory, and the like.

The actual condition information extraction apparatus 10 extracts, for example, at least one of following information (A1), . . . , (A7) as the actual condition information:

(A1) information indicating a type and setting contents of the field device 61;

(A2) information indicating an installation position of the field device 61;

(A3) path information of the network (the field network N1 or the control network N2);

(A4) information indicating types and setting contents of devices constituting the network;

(A5) information indicating setting contents or a used control program of the controller 62;

(A6) information indicating a configuration or a used program of the manipulation monitoring apparatus 63; and (A7) information indicating types or the like of devices of other companies used in the process control system 60.

Here, the process control system 60 often includes a combination of devices provided from a plurality of vendors. When a format of information is different from vendor to vendor, it is difficult to handle the actual condition information extracted by the actual condition information extraction apparatus 10. Therefore, it is desirable to define a format (a standard format) of the actual condition information in advance so that actual condition information of the standard format is extracted from the actual condition information extraction apparatus 10.

The specification information database 20 is a database which stores specification information indicating a specification of the process control system 60 and is connected to the information network N3. Specifically, information for components (the field device 61, the controller 62, the network, and various programs used in the process control system 60) of the process control system 60 is stored in the specification information database 20. For example, at least one of information indicating a physical and logical connection relationship of the respective components, information indicating setting contents of each component, information indicating control specification, information indicating functionality specification, and drawing information such as a P&ID (Piping and Instrument Diagram) or a PFD (Process Flow Diagram) is stored in the specification information database 20.

The application server 30 includes a specification information extraction unit 31, a specification information comparison unit 32 (a first comparison unit), and a notification unit 33. The application server 30 reports (outputs) information indicating a difference between the specification of the process control system 60 and the actual condition for the process control system 60 using the actual condition information extracted by the actual condition information extraction apparatus 10 and the specification information stored in the specification information database 20. Further, the application server 30 is connected to the information network N3, similar to the specification information database 20, and may be realized by a computer including an input device such as a keyboard or a pointing device, a display unit such as a liquid crystal display device, a CPU (central processing unit), a memory, and the like, similar to the actual condition information extraction apparatus 10.

The specification information extraction unit 31 extracts specification information regarding a configuration, settings, etc. in the specification of the process control system 60 from the specification information stored in the specification information database 20. Specifically, the specification information extraction unit 31 extracts, as specification information, the same (the same type of) information as the actual condition information extracted by the actual condition information extraction apparatus 10, but extracts, for example, at least one of following information (B1), . . . , (B16):

(B1) Information indicating a type and setting contents of the field device 61;

(B2) information indicating an installation position of the field device 61;

(B3) information indicating a port used in each component;

(B4) change history information of setting contents or installation contents of each component;

(B5) information indicating a device connected to the network;

(B6) information indicating a physical and logical connection relationship of the network;

(B7) information indicating a medium, speed, external connection destination or the like of the network;

(B8) information indicating the control program used in the controller 62;

(B9) source code of the control program (extracted as necessary);

(B10) information indicating, for example, a version of firmware used in each piece of hardware;

(B11) network setting information in each piece of hardware;

(B12) screen setting information of the manipulation monitoring apparatus 63;

(B13) information indicating a version, size or the like of an application program;

(B14) account or security setting information of a user of the application program;

(B15) information (drawing information such as P&ID or PFD) of the plant; and (B16) a model of a simulator (extracted as necessary).

Here, if formats of the specification information stored in the specification information database 20 are not unified, it takes time to extract the specification information, or specification information different from intended specification information is likely to be extracted. Therefore, it is desirable for the specification information to be stored in UML (Unified Modeling Language), XML (Extensible Markup Language), or other unified formats in the specification information database 20.

The specification information comparison unit 32 compares the actual condition information and the specification information for all components within a previously set range in the process control system 60 among the actual condition information extracted by the actual condition information extraction apparatus 10 and the specification information extracted by the specification information extraction unit 31. The specification information comparison unit 32 outputs information (first information; comparison result information) indicating a result of the comparison. When a difference has been generated in the comparison between the actual condition information with the specification information, the specification information comparison unit 32 generates information (hereinafter referred to as "specification difference information)" including information indicating a time at which the difference was generated and information indicating a place in which the difference was generated. Further, even when the difference has been resolved, specification difference information including information indicating a time at which the difference was resolved and information indicating a place in which the difference was resolved may also be generated.

The notification unit 33 notifies (outputs to) a previously designated notification destination of the information indicating the comparison result of the specification information comparison unit 32. Here, the notification destination which the notification unit 33 notifies of the comparison result of the specification information comparison unit 32 is, for example, a terminal device used by a site engineer in charge of (who manages) each of the components of the process control system 60 or a correction apparatus (not illustrated) which can automatically correct the contents of the specification information database 20.

Figure 2:
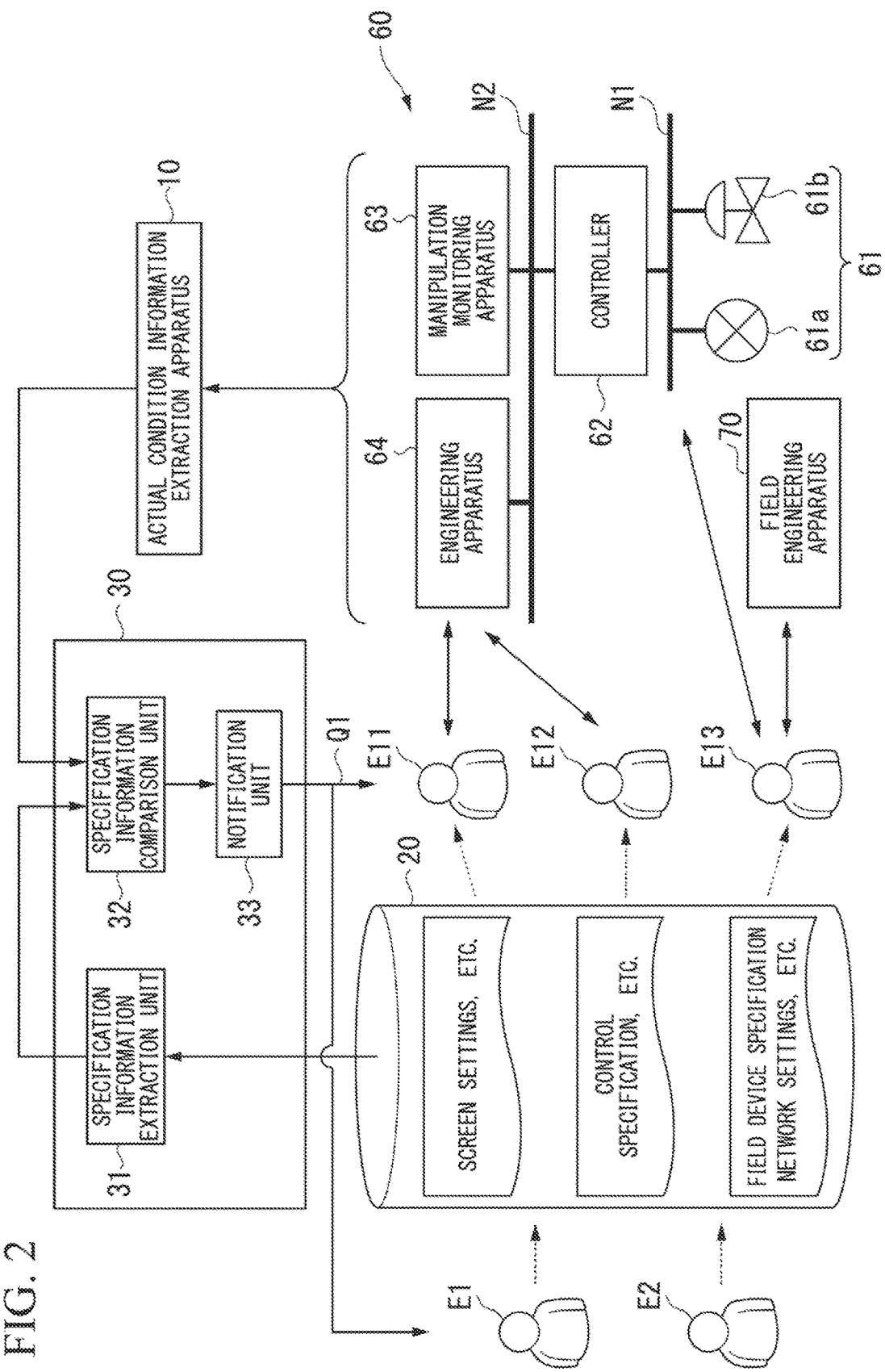
FIG. 2 is a diagram illustrating an operation of the maintenance support system according to the first embodiment of the present invention.

Next, an operation of the maintenance support system 1 will be described. FIG. 2 is a diagram illustrating an operation of the maintenance support system 1 according to the first embodiment of the present invention. A case in which system engineers E1 and E2 and site engineers E11, E12 and E13 perform the maintenance of the process control system 60 as illustrated in FIG. 2 will be described in the first embodiment.

The system engineers E1 and E2 mainly perform a task of correcting the specification information stored in the specification information database 20. The site engineers E11, E12 and E13 perform a task of performing the maintenance of each of the components of the process control system 60 based on the specification information stored in the specification information database 20. Further, as illustrated in FIG. 2, the specification information stored in the specification information database 20 is divided for each of the components that the site engineers E11, E12 and E13 are in charge of.

Specifically, the site engineer E11 performs, for example, a task of changing display contents of the display screen of the manipulation monitoring apparatus 63 based on screen setting information stored in the specification information database 20. The site engineer E12 performs, for example, a task of manipulating the engineering apparatus 64 based on information indicating a control specification stored in the specification information database 20 to change the settings of the controller 62. The site engineer E13 performs, for example, a task of performing maintenance of the field network N1 based on the network setting information stored in the specification information database 20 or manipulating a field engineering apparatus 70 based on field device specification information to change settings of the field device 61. The field engineering apparatus 70 is, for example, a portable terminal and performs infrared or wireless communication with the field device 61 to perform settings of the field device 61.

Figure 3A:
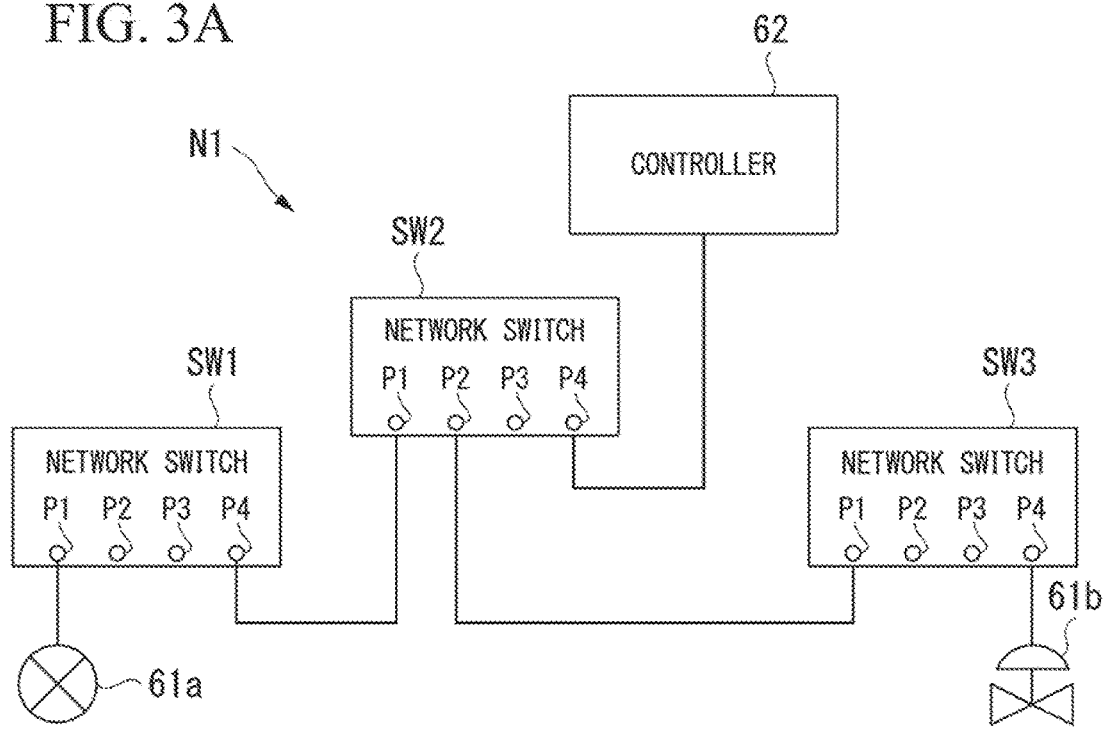
FIG. 3A is a diagram illustrating an example of a configuration according to a specification of a process control system in the first embodiment of the present invention.
Figure 3B:
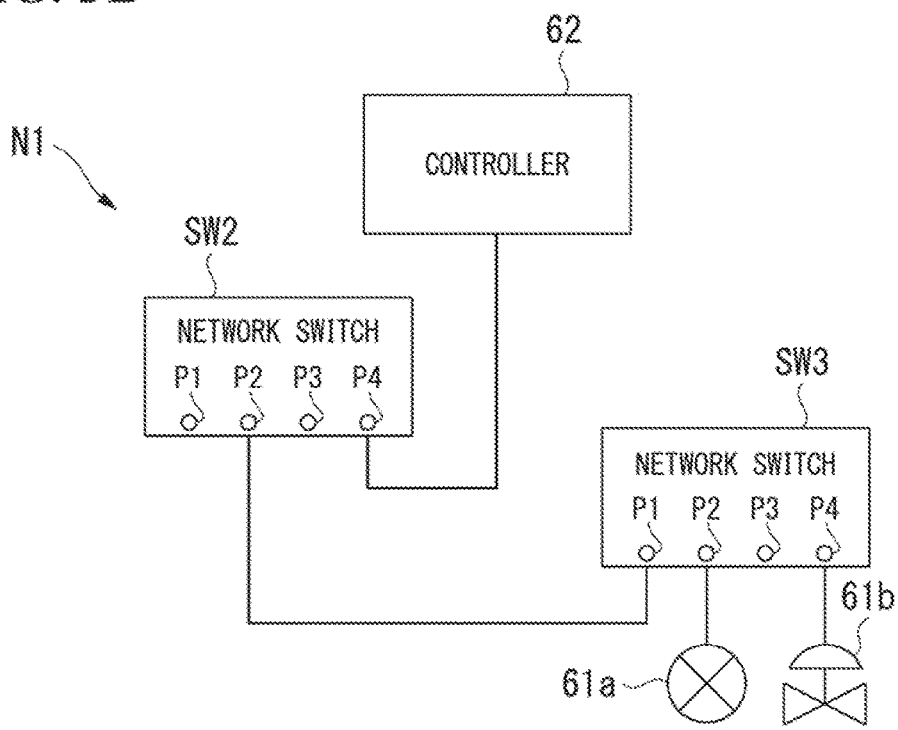
FIG. 3B is a second diagram illustrating an example of an actual condition for the process control system in the first embodiment of the present invention.

In order to facilitate understanding, a case in which a difference illustrated in FIGS. 3A and 3B is generated between the specification of the process control system 60 and the actual condition for the process control system 60 will be described. FIGS. 3A and 3B are diagrams illustrating the examples of the difference between the specification and the actual condition for the process control system in the first embodiment of the present invention. FIG. 3A is a diagram illustrating a configuration according to the specification of the field network N1. FIG. 3B is a diagram illustrating the actual condition for the field network N1.

As illustrated in FIG. 3A, in the configuration according to the specification of the field network N1, three network switches SW1 to SW3 are connected to one another, and the sensor device 61a is connected to a port P1 of the network switch SW1, the valve device 61b is connected to a port P4 of the network switch SW3, and the controller 62 is connected to a port P4 of the network switch SW2. On the other hand, as illustrated in FIG. 3B, in the actual condition for the field network N1, the network switch SW1 is removed from the configuration illustrated in FIG. 3A, and the sensor device 61a is connected to a port P2 of the network switch SW3. Since the field network N1 is digitized (is a bus), the communication through the field network N1 is performed normally even when there is the above-described difference between the specification and the actual condition.

Figures 4, 5:
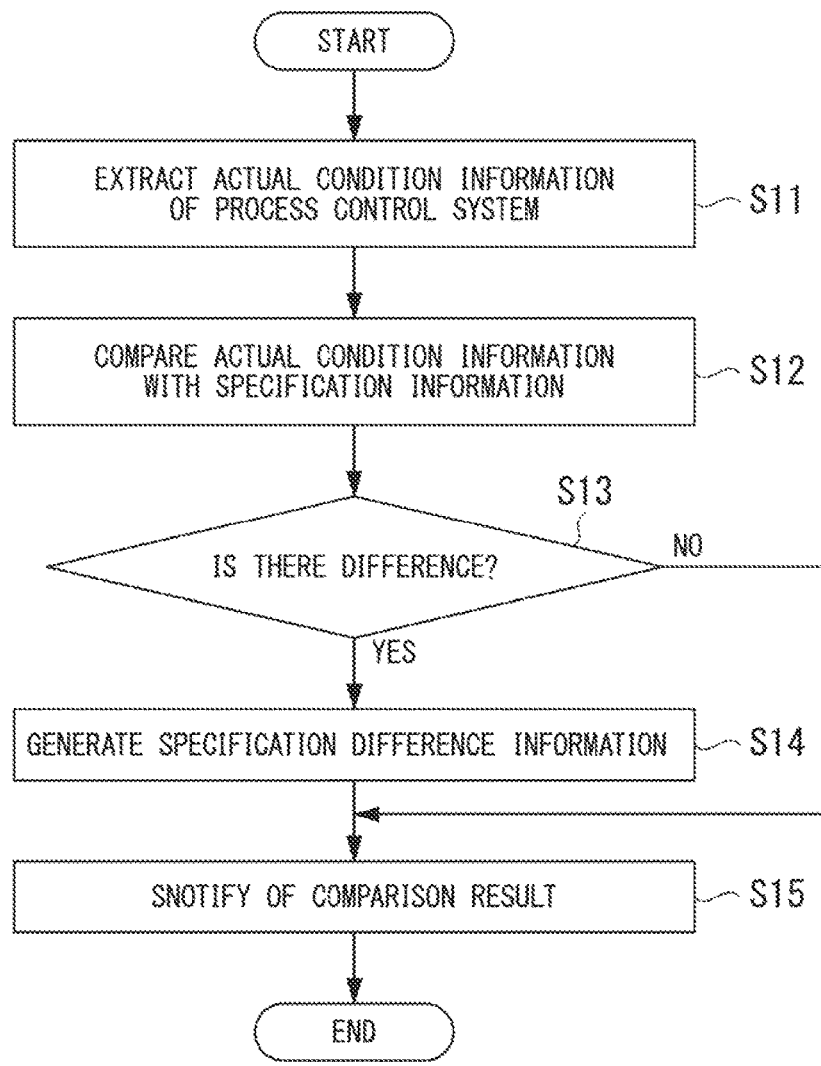
FIG. 4 is a flowchart illustrating an operation of the maintenance support system according to the first embodiment of the present invention.
FIG. 5 is a table illustrating an example of specification difference information generated in the first embodiment of the present invention.

FIG. 4 is a flowchart illustrating an operation of the maintenance support system 1 according to the first embodiment of the present invention. Further, the flowchart illustrated in FIG. 4 is executed, for example, at regular intervals. When a process of the flowchart illustrated in FIG. 4 starts in a state in which there is the difference illustrated in FIGS. 3A and 3B, a process of extracting the actual condition information indicating the actual condition for the process control system 60 is first performed by the actual condition information extraction apparatus 10 (step S11). The actual condition information extracted by the actual condition information extraction apparatus 10 is transmitted to the application server 30, as illustrated in FIG. 2.

When the actual condition information from the actual condition information extraction apparatus 10 is received by the application server 30, a process of comparing the actual condition information with the specification information extracted by the specification information extraction unit 31 is performed by the specification information comparison unit 32 (step S12). Further, the process (a process of extracting the specification information from the specification information database 20) of the specification information extraction unit 31 is performed, for example, at regular intervals or performed when the contents of the specification information database 20 is changed.

If the comparison between the actual condition information and the specification information is performed, the specification information comparison unit 32 determines whether there is a difference between the actual condition information and the specification information (step S13). Here, there is a difference between the specification of the field network N1 and the actual condition, as described with reference to FIGS. 3A and 3B. Therefore, a determination result of step S13 is "YES," and a process of generating specification difference information including the information indicating a time at which the difference was generated and information indicating a place in which the difference was generated is performed by the specification information comparison unit 32 (step S14). Further, when it is determined that there is no difference (when the determination result of step S13 is "NO"), the process of step S14 is omitted.

FIG. 5 is a table illustrating an example of the specification difference information generated in the first embodiment of the present invention. The specification difference information includes information (a detection time) indicating a time at which the difference was generated, and information (actual condition information and specification information) indicating a place in which the difference was generated, as illustrated in FIG. 5. The information indicating the time at which the difference was generated is information indicating an actual time at which the difference between the actual condition information and the specification information was detected by the specification information comparison unit 32. Further, the information indicating the place in which the difference was generated is information in which the actual condition information and the specification information which differ are associated.

Specifically, the specification difference information illustrated in FIG. 5 indicates that two differences shown in (C1) and (C2) below are generated.

(C1) A connection between a port P4 of the network switch SW1 and a port P1 of the network switch SW2 has not actually been made, and (C2) the sensor device 61a to be connected to the port P1 of the network switch SW1 has actually been connected to a port P2 of the network switch SW3.

When the above-described process ends, the information indicating the comparison result of the specification information comparison unit 32 is output to the notification unit 33, and reported (output) to a previously designated notification destination as maintenance information Q1 (see FIG. 2) (step S15). Here, when the process of step S14 is executed and the specification difference information is generated by the specification information comparison unit 32, the generated specification difference information is output to the notification unit 33 together with the information indicating the comparison result, and reported (output) to the previously designated notification destination as the maintenance information Q1. Since there is a difference between the specification and the actual condition for the field network N1, the terminal devices used by the system engineers E1 and E2 and the site engineer E13 illustrated in FIG. 2 are notified of the maintenance information Q1, for example.

When the above-described notification is made, a task of correcting contents of the specification information database 20, for example, is performed based on the notified maintenance information Q1 by the system engineers E1 and E2. Further, there are a variety of effects of a change in some components due to the complexity of the process control system 60. Therefore, it is desirable to perform, in a previously set range, confirmation of specifications of components other than the component in which the difference was generated and to perform correction if necessary. Further, when it is necessary to correct the actual condition for the process control system 60, the site engineers E11 to E13 are notified of this and the actual condition is corrected.

When the system engineers E1 and E2 or the site engineers E11 to E13 confirm that there is no problem in the correction contents, the engineers update the specification information stored in the specification information database 20. In this case, for history management, all pieces of specification information to be updated are updated in correlation with maintenance information (specification difference information) from the application server 30. Through such correlation, it is possible to easily perform identification of causes of updating of the specification information of the specification information database 20. Further, the updating of the specification information stored in the specification information database 20 may be performed after approval of a manager or the like is obtained, as necessary. Further, when the specification information database 20 is updated, it is desirable to perform backup, including previous history information. In other words, when the specification information database 20 is updated, it is desirable to store the previous history information in the specification information database 20 without deleting the previous history information.

FIGS. 6A to 6C are diagrams illustrating examples of changes in the actual condition information and the specification information in the first embodiment of the present invention. FIG. 6A is a diagram illustrating actual condition information and specification information of the field network N1 in an initial state. FIG. 6B is a diagram illustrating actual condition information and specification information when the difference illustrated in FIGS. 3A and 3B has been generated. FIG. 6C is a diagram illustrating actual condition information and specification information when the difference illustrated in FIGS. 3A and 3B has been eliminated. Further, in FIGS. 6A to 6C, only information indicating a connection relationship of the network switches SW1 to SW3 constituting the field network N1, the sensor device 61a, the valve device 61b and the controller 62 is illustrated in order to simplify description.

The initial state is a state immediately after the process control system 60 is built, and in the initial state, no change of components is performed. Therefore, if the process control system 60 is built according to its specification, actual condition information and specification information of the field network N1 match, as illustrated in FIG. 6A. On the other hand, for example, when the network switch SW1 is removed from the configuration illustrated in FIG. 3A and the sensor device 61a is connected to the port P2 of the network switch SW3 by a task of the site engineer E13, a difference D1 is generated between the actual condition information and the specification information, as illustrated in FIG. 6B.

When the difference D1 illustrated in FIG. 6B is generated, information indicating the difference D1 (maintenance information Q1 including the specification difference information illustrated in FIG. 5) is reported from the maintenance support system 1. Based on the specification difference information included in the maintenance information Q1, for example, the system engineers E1 and E2 perform a task of correcting the specification information stored in the specification information database 20 to match the actual condition information. Accordingly, the difference D1 between the actual condition information and the specification information is eliminated, as illustrated in FIG. 6C.

As described above, in the first embodiment, the specification information database 20 which stores the specification information indicating the specification of the process control system 60, and the actual condition information extraction apparatus 10 which extracts the actual condition information indicating the actual condition for the process control system 60 are provided, and the application server 30 compares the specification information with the actual condition information extracted by the actual condition information extraction apparatus 10 and outputs the maintenance information Q1 indicating the comparison result. Thus, when there is the difference between the specification and the actual condition for the process control system 60, this difference is automatically presented as the maintenance information Q1 from the maintenance support system 1. Therefore, it is possible to easily match the specification information stored in the specification information database 20 with the actual condition information. Accordingly, it is possible to effectively perform the maintenance of the process control system 60 in a short time even when the process control system 60 is operated for a long period of time and the change of the components is frequently performed.

Second Embodiment

Figure 7:
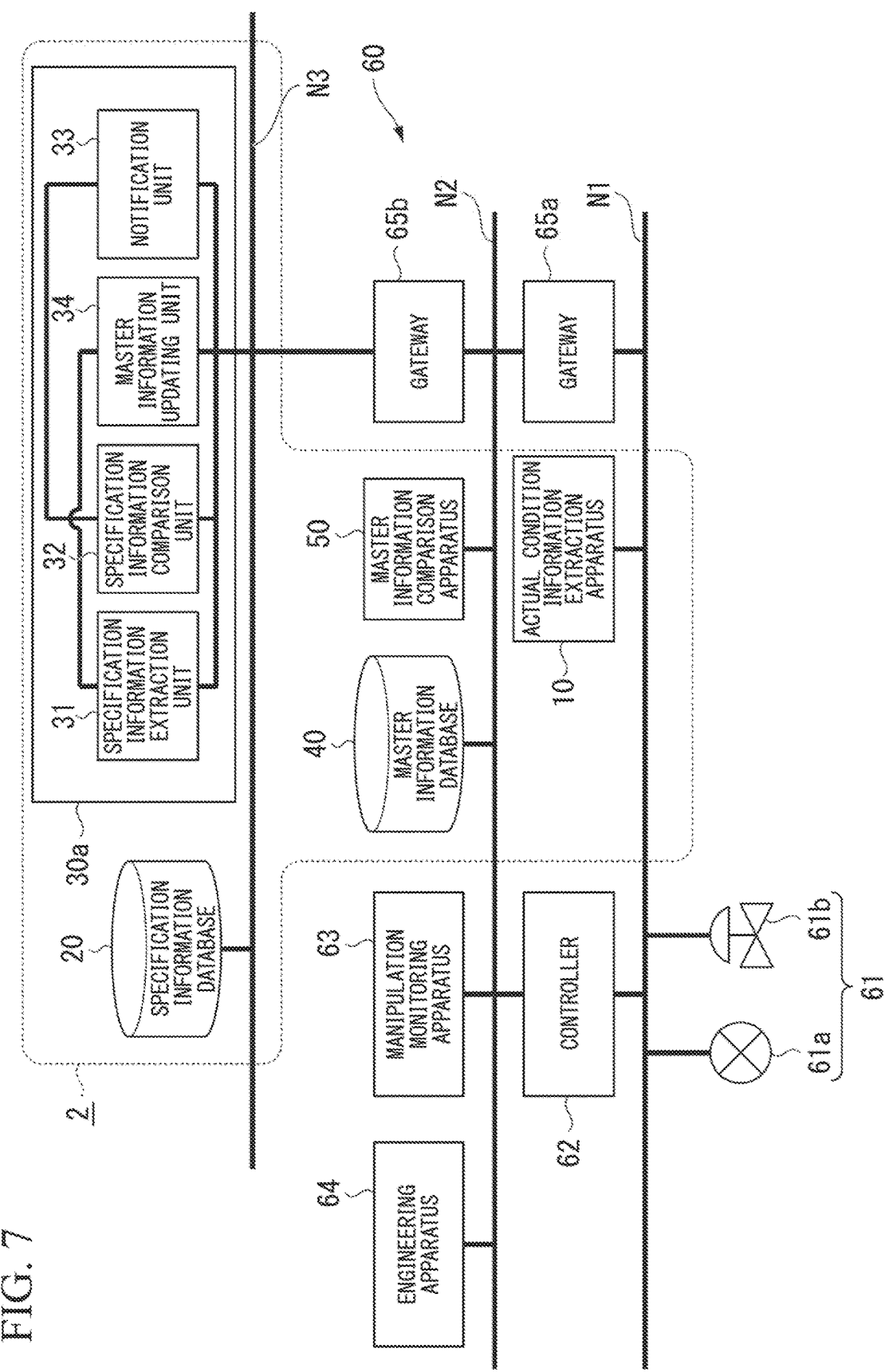
FIG. 7 is a block diagram illustrating a main configuration of a maintenance support system according to a second embodiment of the present invention.

FIG. 7 is a block diagram illustrating a main configuration of a maintenance support system 2 according to a second embodiment of the present invention. As illustrated in FIG. 7, in the maintenance support system 2 of the second embodiment, an application server 30a is provided in place of the application server 30 included in the maintenance support system 1 illustrated in FIG. 1, and a master information database 40 (a second storage unit) and a master information comparison apparatus 50 (a second comparison unit) are newly added.

Further, in the second embodiment, portions having the same configuration as those of the first embodiment are denoted by the same reference numerals, and a description thereof is omitted.

The master information database 40 is a database which stores specification information indicating a specification of the process control system 60, similar to the specification information database 20, and is connected to a control network N2. However, the master information database 40 does not store exactly the same specification information as the specification information stored in the specification information database 20, but stores specification information of a format extracted by a specification information extraction unit 31 included in the application server 30a. For example, a specification information database 20 stores specification information of a file format whose contents can be easily confirmed by an engineer or the like using a computer. The master information database 40 stores specification information of a data format easily compared by the computer. Hereinafter, the specification information stored in the master information database 40 is referred to as "master information."

The master information comparison apparatus 50 is connected to a control network N2. The master information comparison apparatus 50 compares actual condition information and master information for all components in a previously set range in a process control system 60 among actual condition information extracted by an actual condition information extraction apparatus 10 and the master information stored in the master information database 40. The master information comparison apparatus 50 outputs information (second information, first comparison result information) indicating a comparison result. Further, the master information comparison apparatus 50 may be realized, for example, by a computer including an input device such as a keyboard or a pointing device, a display unit such as a liquid crystal display device, a CPU (central processing unit), a memory, and the like, similar to the actual condition information extraction apparatus 10.

When a difference has been generated in a comparison between the actual condition information and the master information, similar to a specification information comparison unit 32 provided in the application server 30a, the master information comparison apparatus 50 generates information (hereinafter referred to as "master difference information") including information indicating a time at which the difference was generated and information indicating a place in which the difference was generated. The master difference information is similar to the specification difference information illustrated in FIG. 5. Further, even when the difference has been resolved, master difference information including information indicating a time at which the difference was resolved and information indicating a place in which the difference was resolved may be generated.

The application server 30a has a configuration in which a master information updating unit 34 (an updating unit) is provided in addition to the specification information extraction unit 31, the specification information comparison unit 32 and the notification unit 33 provided in the application server 30 illustrated in FIG. 1. When a comparison result of the specification information comparison unit 32 (maintenance information Q1 notified of from the notification unit 33) indicates that there is no difference, the master information updating unit 34 updates the master information database 40 so that contents of correction for the specification information stored in the specification information database 20 are reflected in the master information database 40.

Further, when updating the master information database 40, the master information updating unit 34 adds, as history information, at least one of information on a time point at which the difference was generated in the comparison result of the specification information comparison unit 32 and information on a time point at which the difference was generated in the comparison result of the master information comparison apparatus 50. Specifically, all pieces of master information to be updated are updated in correlation with at least one of the specification difference information generated by the specification information comparison unit 32 and the master difference information generated by the master information comparison apparatus 50. Through such correlation, it is possible to easily perform identification of causes of the updating of the master information of the master information database 40. Further, the updating of the master information stored in the master information database 40 may be performed after the approval of a manager or the like is obtained, as necessary. Further, it is desirable to perform backup, including previous history information when the master information database 40 is updated.

Figure 8:
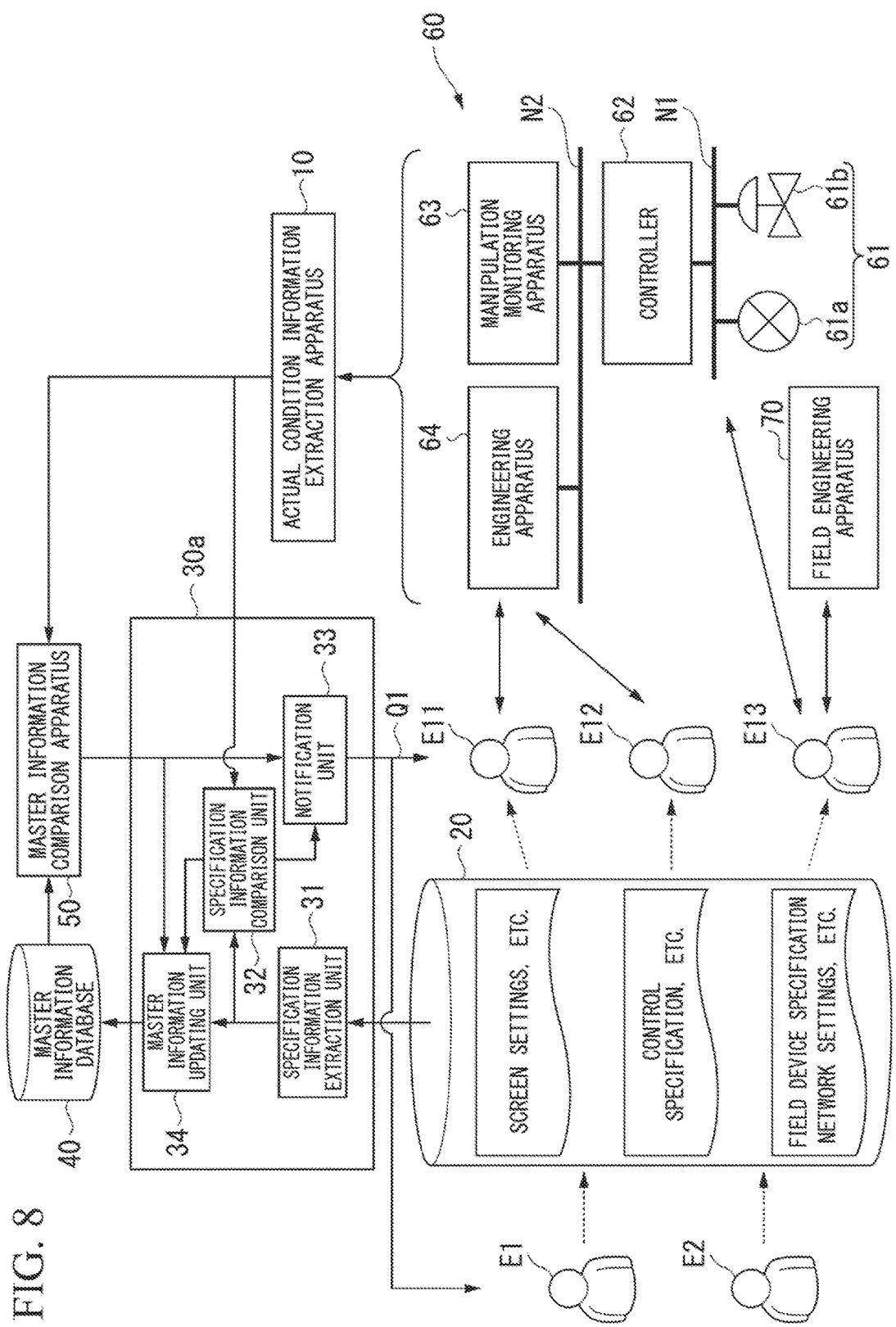
FIG. 8 is a diagram illustrating an operation of the maintenance support system according to the second embodiment of the present invention.

Next, an operation of the maintenance support system 2 in the configuration described above will be described. FIG. 8 is a diagram illustrating an operation of the maintenance support system 2 according to the second embodiment of the present invention. In the second embodiment, system engineers E1 and E2 and site engineers E11, E12 and E13 perform maintenance of the process control system 60, similar to the first embodiment. Further, a case in which the difference illustrated in the FIGS. 3A and 3B is generated between the specification of the process control system 60 and the actual condition for the process control system 60 will be described in the second embodiment as well to facilitate understanding.

Figure 9:
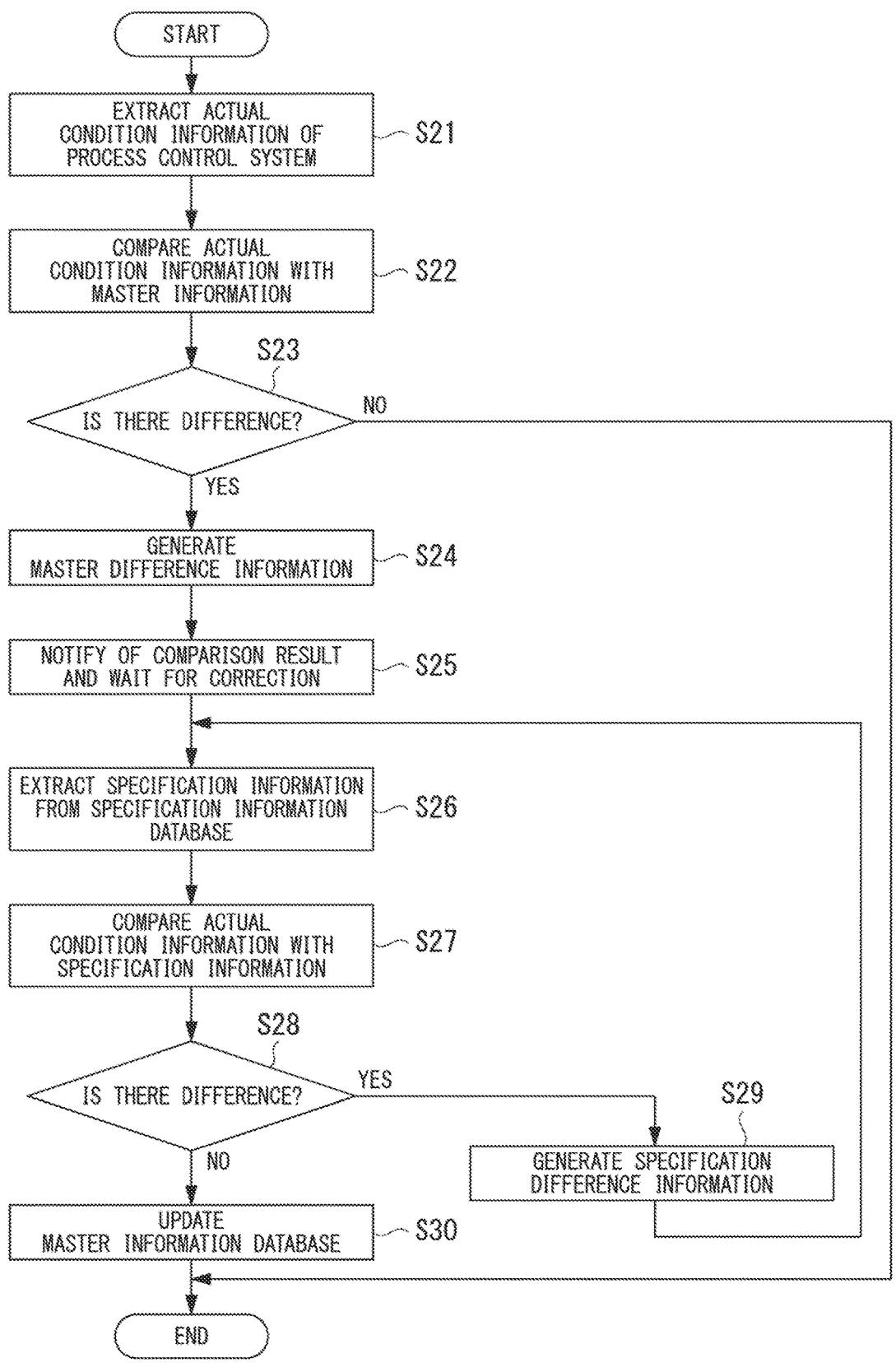
FIG. 9 is a flowchart illustrating an operation of the maintenance support system according to the second embodiment of the present invention.

FIG. 9 is a flowchart illustrating an operation of the maintenance support system 2 according to the second embodiment of the present invention. When a process of the flowchart illustrated in FIG. 9 starts in a state in which there is the difference illustrated in FIGS. 3A and 3B, a process of extracting actual condition information indicating an actual condition for the process control system 60 is performed by the actual condition information extraction apparatus 10 (step S21). The actual condition information extracted by the actual condition information extraction apparatus 10 is transmitted to the master information comparison apparatus 50 and the application server 30a, as illustrated in FIG. 8.

When the actual condition information from the actual condition information extraction apparatus 10 is received by the master information comparison apparatus 50, a process of comparing the actual condition information with the master information stored in the master information database 40 is performed by the master information comparison apparatus 50 (step S22). When the comparison between the actual condition information and the master information is preformed, the master information comparison apparatus 50 determines whether there is a difference between the actual condition information and the master information (step S23). Here, there is the difference between the specification and the actual condition for the field network N1, as described with reference to FIGS. 3A and 3B. Therefore, a determination result of step S23 is "YES," and a process of generating master difference information including information indicating a time at which the difference was generated and the information indicating a place in which the difference was generated is performed by the master information comparison apparatus 50 (step S24). The master difference information generated by the master information comparison apparatus 50 is similar to the specification difference information illustrated in FIG. 5. Further, when the master information comparison apparatus 50 determines that there is no difference (when the determination result of step S23 is "NO"), a process after step S24 is omitted.

When the above-described process ends, information indicating the comparison result of the master information comparison apparatus 50 is transmitted to the notification unit 33 of the application server 30a, and reported (output) to a previously designated notification destination as maintenance information Q1 (see FIG. 8) (step S25). Here, when the process of step S24 is performed and the master difference information is generated by the master information comparison apparatus 50, the generated master difference information is transmitted to the notification unit 33 together with the information indicating the comparison result and reported (output) to the previously designated notification destination as the maintenance information Q1. Here, since there is the difference between the specification and the actual condition for the field network N1, the system engineers E1 and E2 and the site engineer E13 illustrated in FIG. 8, for example, are notified of the maintenance information Q1. When the above-described notification is made, a task of correcting contents of the specification information database 20 based on the notified maintenance information Q1 is performed, for example, by the system engineers E1 and E2.

When the correction task ends, a process of extracting the specification information from the specification information database 20 is performed by the specification information extraction unit 31 of the application server 30a (step S26). The specification information corrected by the system engineers E1 and E2 is also extracted by performing such a process. When the specification information is extracted by the specification information extraction unit 31, a process of comparing the extracted specification information with the actual condition information is performed by the specification information comparison unit 32 of the application server 30a (step S27). Further, the actual condition information compared with the specification information may be the actual condition information extracted in step S21 or may be newly extracted actual condition information.

If the comparison between the actual condition information and the specification information is performed, the specification information comparison unit 32 determines whether there is a difference between the actual condition information and the specification information (step S28). Further, since there may be a variety of effects of a change in some components due to the complexity of the process control system 60, it is desirable for the comparison with the actual condition information to be also performed on the specification information of components other than a component whose specification information has been corrected, in a previously set range.

When it is determined that there is a difference between the actual condition information and the specification information (when a determination result of step S28 is "YES"), a process of generating specification difference information including information indicating a time at which the difference was generated and information indicating a place in which the difference was generated is performed by the specification information comparison unit 32 (step S29). Further, when the specification difference information is generated, a process of extracting the specification information from the specification information database 20 is performed (step S26), and a process of comparing the extracted specification information with the actual condition information is performed again (step S27).

On the other hand, when it is determined that there is no difference between the actual condition information and the specification information (when the determination result of step S28 is "NO"), a process of updating the master information database 40 is performed by the master information updating unit 34 (step S30). Specifically, the updating of the master information database 40 is performed so that the contents of the correction for the specification information stored in the specification information database 20 are reflected in the master information database 40. In this case, the master information updating unit 34 updates all master information to be updated in correlation with the specification difference information generated by the specification information comparison unit 32 and the master difference information generated by the master information comparison apparatus 50.

FIGS. 10A to 10C are diagrams illustrating examples of changes in the actual condition information, the specification information and the master information in the second embodiment of the present invention. FIG. 10A is a diagram illustrating the actual condition information, the specification information and the master information when the difference illustrated in FIGS. 3A and 3B has been generated. FIG. 10B is a diagram illustrating the actual condition information, the specification information and the master information after the difference illustrated in FIGS. 3A and 3B has been eliminated. FIG. 10C is a diagram illustrating the actual condition information, the specification information and the master information after the master information has been updated. Further, in FIGS. 10A to 10C, only information indicating a connection relationship among network switches SW1 to SW3 constituting the field network N1, a sensor device 61a, a valve device 61b, and a controller 62 are illustrated, similar to FIGS. 6A to 6C.

When the difference illustrated in FIGS. 3A and 3B is generated, a difference D2 is generated between the actual condition information and the specification information, as illustrated in FIG. 10A. When the difference D2 illustrated in FIG. 10A is generated, information indicating the difference D2 (maintenance information Q1 including the specification difference information illustrated in FIG. 8) is reported from the maintenance support system 2. Based on the specification difference information included in the maintenance information Q1, for example, the system engineers E1 and E2 perform a task of correcting the specification information stored in the specification information database 20 to be matched with the actual condition information. Accordingly, the difference D2 between the actual condition information and the specification information is eliminated, as illustrated in FIG. 10B. Furthermore, when the master information database 40 is updated by the master information updating unit 34 of the application server 30a, contents of the actual condition information, the specification information and the master information match as illustrated in FIG. 10C.

Figure 11:
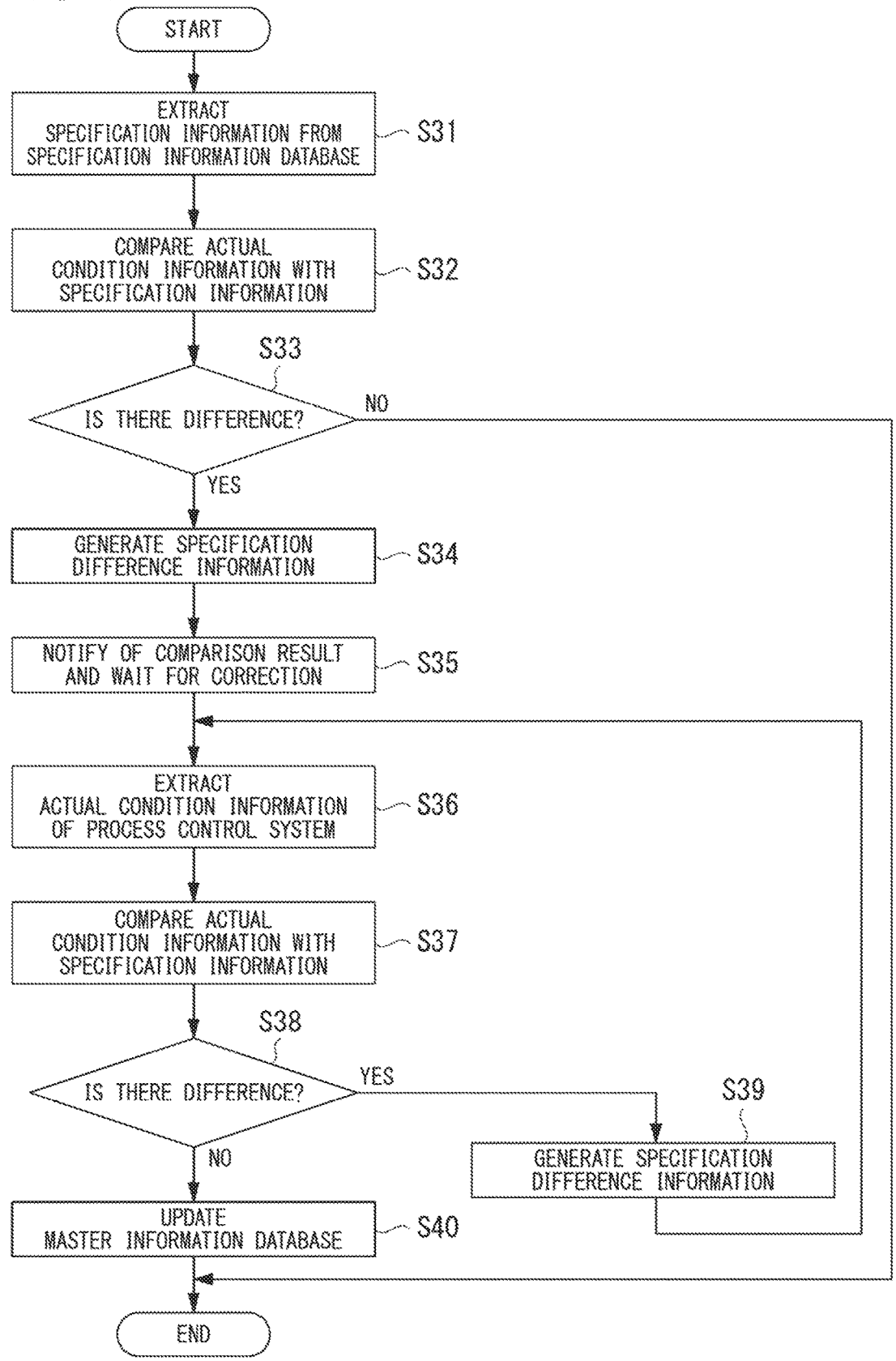
FIG. 11 is a flowchart illustrating another operation of the maintenance support system according to the second embodiment of the present invention.

FIG. 11 is a flowchart illustrating another operation of the maintenance support system 2 according to the second embodiment of the present invention. The flowchart illustrated in FIG. 9 illustrates an operation when the specification information stored in the specification information database 20 is corrected to be matched with a change in actual condition for the process control system 60 when the change in the actual condition is generated. On the other hand, the flowchart illustrated in FIG. 11 illustrates an operation when the actual condition for the process control system 60 is corrected to be matched with a change in specification information stored in the specification information database 20 when the change in the specification information is generated.

When a process of the flowchart illustrated in FIG. 11 starts in a state in which the specification information stored in the specification information database 20 has been corrected by the system engineers E1 and E2, a process of extracting the specification information from the specification information database 20 is first performed by the specification information extraction unit 31 of the application server 30a (step S31). The specification information corrected by the system engineers E1 and E2 is extracted by performing such a process.

If the specification information is extracted by the specification information extraction unit 31, a process of comparing the extracted specification information with the actual condition information is performed by the specification information comparison unit 32 of the application server 30a (step S32). Further, a case in which the actual condition information compared with the specification information has been extracted by the actual condition information extraction apparatus 10 in advance will be described herein to simplify description. If the comparison between the actual condition information and the specification information is performed, the specification information comparison unit 32 determines whether there is a difference between the actual condition information and the specification information (step S33). When it is determined that there is a difference between the actual condition information and the specification information (when a determination result of step S33 is "YES"), a process of generating specification difference information is performed by the specification information comparison unit 32 (step S34). On the other hand, when it is determined that there is no difference between the actual condition information and the specification information (when the determination result of step S33 is "NO"), a process after step S34 is omitted.

When the above-described process ends, information indicating the comparison result of the specification information comparison unit 32 is output to the notification unit 33, and reported (output) to the previously designated notification destination as maintenance information Q1 (step S35). Here, when the process of step S34 is performed and the specification difference information is generated by the specification information comparison unit 32, the generated specification difference information is output to the notification unit 33 together with the information indicating the comparison result and reported (output) to the previously designated notification destination as maintenance information Q1. When the above-described notification is made, for example, a task of changing the actual condition for the process control system 60 based on the notified maintenance information Q1 is performed by the site engineers E11 to E13.

When the correction task ends, a process of extracting the actual condition information of the process control system 60 is performed by the actual condition information extraction apparatus 10 (step S36). The actual condition information corrected by the site engineers E11 to E13 is extracted by performing such a process. When the actual condition information is extracted by the actual condition information extraction apparatus 10, a process of comparing the extracted actual condition information with the specification information is performed by the specification information comparison unit 32 of the application server 30a (step S37). Further, the specification information compared with the actual condition information may be the specification information extracted in step S31 or may be newly extracted specification information.

When the comparison between the actual condition information and the specification information is performed, the specification information comparison unit 32 determines whether there is a difference between the actual condition information and the specification information (step S38). When it is determined that there is a difference between the actual condition information and the specification information (when a determination result of step S38 is "YES"), a process of generating specification difference information including information indicating a time at which the difference was generated and information indicating a place in which the difference was generated is performed by the specification information comparison unit 32 (step S39). Further, when the specification difference information is generated, a process of extracting actual condition information of the process control system 60 is performed (step S36), and a process of comparing the extracted actual condition information with the specification information is performed again (step S37).

On the other hand, when it is determined that there is no difference between the actual condition information and the specification information (the determination result of step S38 is "NO"), a process of updating the master information database 40 is performed by the master information updating unit 34 (step S40). Specifically, the updating of the master information database 40 is performed so that contents of the correction for the specification information stored in the specification information database 20 are reflected in the master information database 40. In this case, the master information updating unit 34 updates all of the master information to be updated in correlation with the specification difference information generated by the specification information comparison unit 32. Contents of the actual condition information, the specification information and the master information match by the above-described process being performed, similar to the example described with reference to FIGS. 10A to 10C.

As described above, in the second embodiment, the master information database 40 which stores the master information, and the master information comparison apparatus 50 which compares the master information with the actual condition information of the process control system 60 are provided, and the maintenance information Q1 indicating the comparison result is output. Thus, when there is a difference between the specification and the actual condition for the process control system 60, the difference is automatically presented from the maintenance support system 2 as the maintenance information Q1. Therefore, in the second embodiment, it is possible to easily match the specification information stored in the specification information database 20 with the actual condition information, similar to the first embodiment. Accordingly, it is possible to effectively perform the maintenance of the process control system 60 in a short time even when the process control system 60 is operated for a long period of time and a change in the components frequently occurs.

Further, in the second embodiment, the correction of the specification information stored in the specification information database 20 is performed while referring to the comparison result of the specification information comparison unit 32 (the result of the comparison between the specification information of the specification information database 20 and the actual condition information) different from the comparison result of the master information comparison apparatus 50 (the result of comparison between the master information and the actual condition information). Therefore, it is possible to perform isolation of causes of the difference between the specification and the actual condition and to easily perform confirmation of the actual condition change in comparison with the first embodiment described above.

For example, a case in which a change occurs in the actual condition for the process control system 60 due to failure, aging or some other cause while the specification information of the specification information database 20 is being corrected will be described. In the first embodiment described above, since only the comparison between the specification information of the specification information database 20 and the actual condition information is performed, it is difficult to determine whether the cause of the difference between the specification information and the actual condition information is the correction of the specification information of the specification information database 20 or a change in actual condition for the process control system 60 due to failure, aging or some other causes.

On the other hand, in the second embodiment, the master information and the actual condition information are compared and the specification information of the specification information database 20 and the actual condition information are also compared. Therefore, when the specification information of the specification information database 20 has been corrected, a difference is generated in only the result of the comparison between the specification information of the specification information database 20 and the actual condition information. Further, when a change occurs in an actual condition for the process control system 60 due to failure, aging, or some other cause, a difference is generated in both of the result of the comparison between the master information and the actual condition information and the result of the comparison between the specification information of the specification information database 20 and the actual condition information. Thus, in the second embodiment, it is possible to perform isolation of causes of the difference between the specification and the actual condition and to easily perform confirmation of the actual condition change in comparison with the first embodiment described above.

While the maintenance support system, the maintenance support apparatus and the maintenance support method according to the first and second embodiments of the present invention have been described, the present invention is not limited to the first and second embodiments described above and can be freely changed within the scope of the present invention. For example, in the first and second embodiments described above, the example in which the actual condition information extraction apparatus 10 constituting the maintenance support system 1 or 2 is connected to the field network N1, the master information database 40 and the master information comparison apparatus 50 are connected to the control network N2, and the specification information database 20 and the application server 30 or 30a are connected to the information network N3 has been described. However, the actual condition information extraction apparatus 10, the master information database 40, the master information comparison apparatus 50, the specification information database 20, and the application server 30 or 30a may be connected to any of the field network N1, the control network N2 and the information network N3. Further, the maintenance support system 1 or 2 is not necessarily provided to be accompanied with the process control system 60, and may be provided in a remote place as long as the maintenance support system 1 or 2 can communicate with the components of the process control system 60.

Further, the actual condition information extraction apparatus 10, the specification information database 20, the application server 30 or 30a, the master information database 40 and the master information comparison apparatus 50 constituting the maintenance support system 1 or 2 may be implemented as separate apparatuses as illustrated in FIGS. 1 and 7 or may be implemented as one apparatus. Further, functions of the actual condition information extraction apparatus 10, the specification information database 20, the application server 30 or 30a, the master information database 40 and the master information comparison apparatus 50 constituting the maintenance support system 1 or 2 may be realized by software, and the maintenance support system 1 or 2 may be mounted on a device or an apparatus (e.g., the controller 62 or the manipulation monitoring apparatus 63) constituting the process control system 60.

Further, the specification information database 20 and the master information database 40 constituting the maintenance support system 1 or 2 may be redundant in order to increase reliability. Further, in the maintenance support system 1 or 2, there is a case in which a field device or a network device whose actual condition information cannot be extracted is provided. In consideration of such a case, in addition to the actual condition information extracted by the actual condition information extraction apparatus 10, a terminal device (an actual condition input unit) which allows a site engineer to directly confirm the device and input actual condition information for the device may be prepared in advance.

Further, a task status such as task advance/progress information may be included in history information (difference detection information) during a changing task. Further, such information may be associated with a project management tool that is an external application. Furthermore, an access right may be given to a change, correction and reference-allowable range based on, for example, ID information of a worker, in order to enhance security at the time of the changing task.

The invention claimed is:

1. A maintenance support system, comprising:
    a first storage unit which stores first specification information including predetermined configurations and settings for devices of a process control system which performs control of an industrial process implemented in a plant, the first specification information being correctable by a user;
    an actual condition information extraction unit configured to extract, from the process control system, actual condition information including current configurations and settings for the devices of the process control system;
    a first comparison unit configured to compare the first specification information stored in the first storage unit with the actual condition information extracted by the actual condition information extraction unit, the first comparison unit being configured to generate first difference information when there is a difference between the first specification information and the actual condition information, the first difference information including a location in which the difference was generated;
    a notification unit configured to notify the user of the first difference information;
    a second storage unit which stores second specification information including configurations and settings for the devices of the process control system;
    a second comparison unit configured to compare the second specification information stored in the second storage unit with the actual condition information extracted by the actual condition information extraction unit; and
    an updating unit configured to update the second storage unit to reflect contents of correction by the user for the first specification information stored in the first storage unit when there is no difference between the first specification information and the actual condition information.

2. The maintenance support system according to claim 1, wherein the first difference information includes a time at which the difference between the first specification information and the actual condition information was generated.

3. The maintenance support system according to claim 1, wherein the updating unit is configured to update the second storage unit to reflect the contents of correction by the user associated with the first difference information.

4. The maintenance support system according to claim 1, wherein the second comparison unit is configured to generate second difference information when there is a difference between the second specification information stored in the second storage unit and the actual condition information extracted by the actual condition information extraction unit, and the second difference information including a location in which the difference was generated.

5. The maintenance support system according to claim 4, wherein the second difference information includes a time at which the difference between the second specification information stored in the second storage unit and the actual condition information extracted by the actual condition information extraction unit was generated.

6. The maintenance support system according to claim 4, wherein the contents of correction by the user to be reflected in the second specification information in the second storage unit are associated with the first difference information and the second difference information.

7. The maintenance support system according to claim 4, wherein the updating unit is configured to add, to the first difference information, at least one of a time point at which a change occurred in the first difference information and a time point at which a change occurred in the second difference information when updating the second storage unit.

8. The maintenance support system according to claim 1, wherein the actual condition information extraction unit is configured to extract, at least one of:
 a current type and current settings for a field device installed in the plant, and
 a current installation position of the field device.

9. The maintenance support system according to claim 1, wherein the actual condition information extraction unit is configured to extract current information for a previously defined format.

10. The maintenance support system according to claim 1, further comprising:
 a specification information extraction unit configured to extract from the first storage unit, as the first specification information, information associated with the actual condition information extracted by the actual condition information extraction unit,
 wherein the first comparison unit is configured to output the first difference information including a result of comparing the first specification information extracted by the specification information extraction unit with the actual condition information extracted by the actual condition information extraction unit.

11. The maintenance support system according to claim 10, wherein the specification information extraction unit is configured to extract the first specification information in a certain period or when the first specification information stored in the first storage unit is changed.

12. The maintenance support system according to claim 1, wherein the first storage unit stores the first specification information in a unified format.

13. The maintenance support system according to claim 1, wherein the first comparison unit is configured to include, in the first difference information, a time at which a difference was resolved between the first specification information and the actual condition information and information indicating a location in which the difference was resolved.

14. The maintenance support system according to claim 1, wherein the first storage unit stores maintenance information of the process control system associated with the first specification information when the first specification information is updated.

15. The maintenance support system according to claim 1, wherein when the first specification information is to be changed, the first storage unit stores the first specification information before the change, without deleting the first specification information before the change.

16. The maintenance support system according to claim 1, further comprising:
 a specification information extraction unit configured to extract from the first storage unit, as the first specification information, information associated with the actual condition information extracted by the actual condition information extraction unit,
 wherein the second storage unit stores, as the second specification information, the specification information having the same format as the first specification information extracted by the specification information extraction unit.

17. The maintenance support system according to claim 1, further comprising:
 an actual condition input unit configured to receive an input of the actual condition information.

18. A maintenance support method, comprising:
 extracting, from a process control system which performs control of an industrial process implemented in a plant, actual condition information including current configurations and settings for devices of the process control system;
 comparing first specification information, stored in a first storage unit and including a specification of predetermined configurations and settings of the devices of the process control system, with the actual condition information extracted, the first specification information being correctable by a user;
 generating first difference information when there is a difference between the first specification information and the actual condition information extracted, the first difference information including a location in which the difference was generated;
 notifying the user of the first difference information;
 comparing second specification information, stored in a second storage unit and including a specification of configurations and settings of the devices of the process control system, with the actual condition information extracted; and
 updating the second storage unit to reflect contents of correction by the user for the first specification information stored in the first storage unit when there is no difference between the first specification information and the actual condition information extracted.

19. The maintenance support method according to claim 18, wherein the first difference information includes a time at which the difference between the first specification information and the actual condition information was generated.

20. The maintenance support method according to claim 18, wherein the update of the second storage unit includes updating the second storage unit to reflect the contents of correction by the user associated with the first difference information.

21. The maintenance support method according to claim 18, further comprising:

generating second difference information when there is a difference between the second specification information stored in the second storage unit and the actual condition information extracted, the second difference information including a place in which the difference was generated.

22. The maintenance support method according to claim 21, wherein the second difference information includes a time at which the difference between the second specification information stored in the second storage unit and the actual condition information extracted was generated.

23. The maintenance support method according to claim 21, wherein the update of the second storage unit includes updating the second storage unit to reflect the contents of correction by the user associated with the first difference information and the second difference information.

* * * * *